United States Patent
Choi et al.

(10) Patent No.: US 8,588,202 B2
(45) Date of Patent: Nov. 19, 2013

(54) METHOD FOR TRANSMITTING SIGNALS FOR INCREASING THE AMOUNT OF DATA TRANSMISSION

(75) Inventors: Jin Soo Choi, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 412 days.

(21) Appl. No.: 12/733,262

(22) PCT Filed: Aug. 13, 2008

(86) PCT No.: PCT/KR2008/004702
§ 371 (c)(1),
(2), (4) Date: Feb. 19, 2010

(87) PCT Pub. No.: WO2009/028814
PCT Pub. Date: Mar. 5, 2009

(65) Prior Publication Data
US 2010/0157787 A1 Jun. 24, 2010

(30) Foreign Application Priority Data
Aug. 29, 2007 (KR) .................. 10-2007-0086993

(51) Int. Cl.
*H04J 1/00* (2006.01)

(52) U.S. Cl.
USPC .......................................... 370/343; 370/465

(58) Field of Classification Search
None
See application file for complete search history.

(56) References Cited

U.S. PATENT DOCUMENTS

| | | |
|---|---|---|
| 2005/0181739 A1 | 8/2005 | Krasny et al. |
| 2006/0003733 A1 | 1/2006 | Chun et al. |
| 2006/0171354 A1* | 8/2006 | Tee et al. ................. 370/329 |
| 2007/0159959 A1* | 7/2007 | Song et al. .............. 370/208 |
| 2008/0137718 A1* | 6/2008 | Cha et al. ................. 375/146 |

* cited by examiner

*Primary Examiner* — Kevin C Harper
(74) *Attorney, Agent, or Firm* — McKenna Long & Aldridge LLP

(57) ABSTRACT

A signal transmission method for increasing the amount of data transmission is described. When a specific transmitting side transmits signals in a signal transmission mode applied to a low-speed transmitting side, the specific transmitting side reduces the number of times of pilot transmission, thereby efficiently increasing a data transmission rate. The amount of data transmitted through one subchannel is set to be the same. To this end, improved subchannel structure, and improved system parameters in which a guard interval is adjusted are provided.

8 Claims, 7 Drawing Sheets

METHOD FOR TRANSMITTING SIGNALS FOR INCREASING THE AMOUNT OF DATA TRANSMISSION

This application is a 35 U.S.C. §371 National Stage entry of International Application No. PCT/KR2008/004702, filed on Aug. 13, 2008, and claims priority to Korean Application No. KR 10-2007-0086993, filed on Aug. 29, 2007 which is hereby incorporated by reference in its entirety as if fully set forth herein.

TECHNICAL FIELD

The present invention relates to a wireless communication system, and more particularly, to a method for transmitting signals including data and pilots, which is capable of increasing the amount of data transmission by effectively reducing the number of pilots when a specific user equipment transmits data in an adaptive modulation and coding (AMC) mode.

BACKGROUND ART

First, an AMC mode which is applied to a low-speed user equipment (UE) in the IEEE (Institute of Electrical and Electronics Engineers) 802.16e system will be described in brief.

FIG. 1 illustrates a structure of one subchannel when an AMC mode is used in the IEEE 802.16e system.

Referring to FIG. 1, a horizontal axis indicates time and a vertical axis indicates frequency. Orthogonal frequency division multiplexing (OFDM) symbols and subcarriers are mapped in a time domain and a frequency domain, respectively, thereby constituting a frame.

In the IEEE 802.16e system, a basic unit structure, called a bin, is used when a specific transmitting side transmits signals in an AMC mode. One bin is comprised of 9 subcarriers including 8 data subcarriers and one pilot subcarrier, as shown in FIG. 1. It is assumed that the term 'data subcarrier' refers to a data transmission unit corresponding to one subcarrier in the frequency domain within one OFDM symbol in the time domain, and the term 'pilot subcarrier' refers to a pilot transmission unit corresponding to the above-described area.

Meanwhile, a subchannel, which is the smallest basic unit of data transmission in the IEEE 802.16e system, is comprised of 6 bins. The number of data subcarriers constituting the subchannel is 48 (=6×8). Although FIG. 1 illustrates an example in which the subchannel structure has 2 bins in the frequency domain and 3 OFDM symbols in the time domain (i.e., 2 bins×3 OFDM symbols), the bins constituting the subchannel may be variously constructed. For example, the subchannel comprised of 6 bins may be constructed in the form of 1 bin×6 OFDM symbols, 2 bins×3 OFDM symbols, 3 bins×2 OFDM symbols, and 6 bins×1 OFDM symbol.

For transmission of data and pilots, a transmitting side in a general multicarrier system including the IEEE 802.16e system appropriately allocates transmission signals to subcarriers and performs inverse fast Fourier transform (IFFT) for the transmission signals to convert and map the transmission signals to time domain signals. A process of allocating the transmission signals to subcarriers will now be described in brief.

The following Table 1 illustrates orthogonal frequency division multiple access (OFDMA) system parameters in case of a fast Fourier transform (FFT) size of 2048 in the IEEE 802.16e system.

TABLE 1

| Parameter | Value |
|---|---|
| Number of DC Subcarriers | 1 (index 1024, count from 0) |
| Number of Guard Subcarriers, left | 160 |
| Number of Guard Subcarriers, right | 159 |
| $N_{used}$, Number of Used Subcarriers (which includes the DC subcarrier)) | 1729 |
| Total Number of Subcarriers | 2048 |
| Number of Pilots | 192 |
| Number of Data Subcarriers | 1536 |
| Number of Physical Bands | 48 |
| Number of Bins per Physical Band | 4 |
| Number of Data Subcarriers per slot | 48 |

In Table 1, a total of 2048 subcarriers include 160 left guard subcarriers, 159 right guard subcarriers, and 1729 used subcarriers. The 1729 used subcarriers include one DC subcarrier, 1536 data subcarriers, and 192 pilot subcarriers.

In addition to an FFT size of 2048 as shown in Table 1, the FFT size may be 1024, 512, 128, etc. The OFDM system parameters when the FFT size is 1024, 512, and 128 are illustrated in Table 2, Table 3, and Table 4, respectively.

TABLE 2

| Parameter | Value | Note |
|---|---|---|
| Number of DC Subcarriers | 1 | — |
| Number of Guard Subcarriers, left | 80 | — |
| Number of Guard Subcarriers, right | 79 | — |
| Number of Used Subcarriers (Nused) (including all possible allocated pilots and the DC subcarrier) | 865 | — |
| Number of Pilot Subcarriers | 96 | — |
| Pilot Subcarrier Index | 9k + 3m + 1, for k = 0, 1, ..., 95, and m = [symbol index] mod 3 | Symbol of index 0 in pilot subcarrier index should be the first symbol of the current zone. m is incremented only for data symbols, excluding preambles, safety zones, sounding symbols, midambles, etc. DC subcarrier is excluded when the pilot subcarrier index is calculated by the equation |
| Number of Data Subcarriers | 768 | — |
| Number of Physical Bands | 24 | — |
| Number of Bins per Physical Band | 4 | — |
| Number of Data Subcarriers per slot | 48 | — |

TABLE 3

| Parameter | Value | Note |
|---|---|---|
| Number of DC Subcarriers | 1 | — |
| Number of Guard Subcarriers, left | 40 | — |
| Number of Guard Subcarriers, right | 39 | — |
| Number of Used Subcarriers (Nused) (including all possible allocated pilots and the DC subcarrier) | 433 | — |

TABLE 3-continued

| Parameter | Value | Note |
|---|---|---|
| Number of Pilot Subcarriers | 48 | — |
| Pilot Subcarrier Index | 9k + 3m + 1, for k = 0, 1, . . . , 47, and m = [symbol index] mod 3 | Symbol of index 0 in pilot subcarrier index should be the first symbol of the current zone. m is incremented only for data symbols, excluding preambles, safety zones, sounding symbols, midambles, etc. DC subcarrier is excluded when the pilot subcarrier index is calculated by the equation |
| Number of Data Subcarriers | 384 | — |
| Number of Physical Bands | 12 | — |
| Number of Bins per Physical Band | 4 | — |
| Number of Data Subcarriers per slot | 48 | — |

TABLE 4

| Parameter | Value | Note |
|---|---|---|
| Number of DC Subcarriers | 1 | — |
| Number of Guard Subcarriers, left | 10 | — |
| Number of Guard Subcarriers, right | 9 | — |
| Number of Used Subcarriers (Nused) (including all possible allocated pilots and the DC subcarrier) | 109 | — |
| Number of Pilot Subcarriers | 12 | — |
| Pilot Subcarrier Index | 9k + 3m + 1, for k = 0, 1, . . . , 11, and m = [symbol index] mod 3 | Symbol of index 0 in pilot subcarrier index should be the first symbol of the current zone. m is incremented only for data symbols, excluding preambles, safety zones, sounding symbols, midambles, etc. DC subcarrier is excluded when the pilot subcarrier index is calculated by the equation |
| Number of Data Subcarriers | 96 | — |
| Number of Physical Bands | 3 | — |
| Number of Bins per Physical Band | 4 | — |
| Number of Data Subcarriers per slot | 48 | — |

As described above, one subchannel in the IEEE 802.16e system is comprised of 6 bins each consisting of 9 subcarriers. One pilot is present per bin with respect to each OFDM symbol in the time domain and is used for channel estimation. 9 subcarriers in the frequency domain are subject to similar channels and each OFDM symbol in the time domain is subject to similar channels. Such a subchannel is the smallest basic unit of signal transmission and it is assumed that one subchannel (or plural subchannels) assigned to the same UE is subject to similar channel environments for transmission during operation in an AMC mode.

The AMC mode during data transmission is applied to a low-speed UE, as compared with a partial usage of subchannels (PUSC) mode applied to a high-speed UE during data transmission. Accordingly, when a specific UE transmits signals in the AMC mode, insertion of pilots into each OFDM symbol does not lead to a significant increase in performance compared to when no pilots are inserted into each OFDM symbol. If pilots are inserted into each OFDM symbol in the AMC mode, since data subcarriers corresponding to the inserted pilots can not be used, an overhead occurs in terms of data transmission. Therefore, an efficient structure can be obtained by reducing the number of pilots and increasing the number of used data subcarriers while maintaining the performance of the system. However, the above IEEE 802.16e system does not propose a solution to such a problem.

DISCLOSURE

Technical Problem

An object of the present invention devised to solve the problem lies in providing a signal transmission method which can decrease the number of times of pilot transmission while maintaining or increasing system performance and thus can increase the number of times of data transmission.

Another object of the present invention devised to solve the problem lies in providing a structure of a transmission signal, such as an improved bin structure and a subchannel structure, to achieve the signal transmission method.

A further object of the present invention devised to solve the problem lies in providing improved system parameters according to an FFT size, to achieve the signal transmission method.

Technical Solution

These and other objects of the present invention can be achieved by providing a method for transmitting signals to increase the amount of data transmission. In one embodiment, the method includes: transmitting signals including data and pilots through a subchannel in time-frequency space by a specific transmitting side, wherein a first signal transmission mode is used in a transmitting side having a mobile speed lower than a prescribed speed and a second signal transmission mode is used in a transmitting side having a mobile speed greater than the prescribed speed, and wherein, if the first signal transmission mode is applied to the specific transmitting side, the specific transmitting side transmits the signals by reducing the number of pilot transmission per subchannel compared to when the second signal transmission mode is applied to the specific transmitting side. The first signal transmission mode may be an AMC mode but is not limited thereto.

In transmitting the signals, the specific transmitting side may transmit pilots at intervals of two OFDM symbols in a time domain of the subchannel. While pilots are transmitted at intervals of an OFDM symbol in an AMC mode in the IEEE 802.16e system, pilots may be transmitted at intervals of two OFDM symbols in an AMC mode applied to a low-speed UE to increase the number of times of data transmission without having a significant difference in performance for channel estimation.

A subchannel structure for supporting the signal transmission method according to an embodiment of the present invention may be as follow.

In one embodiment, the subchannel may include a prescribed number of bins and the number of subcarriers included in one bin may be set such that the number of data transmitted through one subchannel is the same irrespective of the signal transmission modes applied to the specific transmitting side. If the number of data transmitted through one subchannel is the same as the number in a conventional communication system, compatibility with the conventional system may be maintained.

In one embodiment, the number of subcarriers included in one bin may be 13 and the subchannel may include 4 bins. A method for providing a structure in which one pilot per two OFDM symbols is transmitted is provided while identically maintaining the number of subcarriers included in one bin and the number of bins included in one subchannel to the number of data transmitted through one subchannel in the conventional system.

In one embodiment, a structure for increasing the amount of data transmission within the same data processing range by reducing the number of transmitted pilots is provided while maintaining the number of data transmitted through one subchannel in the conventional system. The subchannel may include 4 bins and the number of subcarriers included in one bin may be 13, and the specific transmitting side may transmit a pilot at intervals of an OFDM symbol in a time domain of the subchannel, that is, transmit one pilot per bin. Therefore, the amount of data transmission is increased and the number of data transmitted through one subchannel may be identically maintained to the number in the conventional system.

In one embodiment, the method may further include performing IFFT upon the signals before signal transmission, and the number of guard subcarriers according to a unit signal size performing the IFFT may be greater than the number of guard subcarriers when the second signal transmission mode is applied to the specific transmitting side. Accordingly, an aliasing problem caused by an increase in a guard interval may be effectively solved.

Advantageous Effects

According to exemplary embodiments of the present invention, an influence of channel estimation caused by a reduction in pilot transmission is minimized when a low-speed UE transmits signals, and the amount of data transmission is efficiently increased as the amount of pilot transmission is decreased.

Further, since the number of data transmitted through one subchannel in a subchannel structure according to exemplary embodiments of the present invention is identical to the number of data in a conventional communication method, compatibility with a conventional system can be achieved.

Furthermore, since a guard interval is increased according to exemplary embodiments of the present invention, an aliasing problem can be effectively solved.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. For example, although a description is made of a signal transmission method including data and pilots using a subchannel structure and system parameters according to exemplary embodiments of the present invention, the present invention may be applied to various methods and apparatuses so long as they include such a subchannel structure and system parameters. Moreover, although the following description is applied to the IEEE 802.16e system as an example of a conventional system, the present invention may be applied to various systems, such as 3GPP and 3GPP2, to increase the amount of data transmission of a low-speed UE.

The following detailed description includes specific details in order to provide a thorough understanding of the present invention. However, it will be apparent to those skilled in the art that the present invention may be practiced without such specific details. For example, specific numerals specifying a subchannel structure and system parameters may be modified according to a system and, even in that case, a principle deriving the numerals may be identically applied.

In some instances, known structures and devices are omitted or are shown in block diagram form, focusing on important features of the structures and devices, so as not to obscure the concept of the present invention. The same reference numbers will be used throughout this specification to refer to the same or like parts.

The present invention provides a signal transmission method which can decrease the number of times of pilot transmission while maintaining or increasing system performance and thus can increase the number of times of data transmission. To this end, a structure of a subchannel for providing such a signal transmission method according to an exemplary embodiment of the present invention will now be described.

In an exemplary embodiment of the present invention, when a specific transmitting side (for example, a UE) transmits signals including data and pilots through a subchannel in time-frequency space in an AMC mode, a method is proposed in which pilots are not transmitted with respect to each OFDM symbol but are instead transmitted with respect to two OFDM symbols. That is, the number of times of pilot transmission is reduced to intervals of two OFDM symbols. Here, intervals of 2 OFDM symbols refer to symbol intervals which are proper for channel estimation even though pilots are transmitted at such intervals in a low-speed UE environment such as in an AMC mode.

Figure 1:
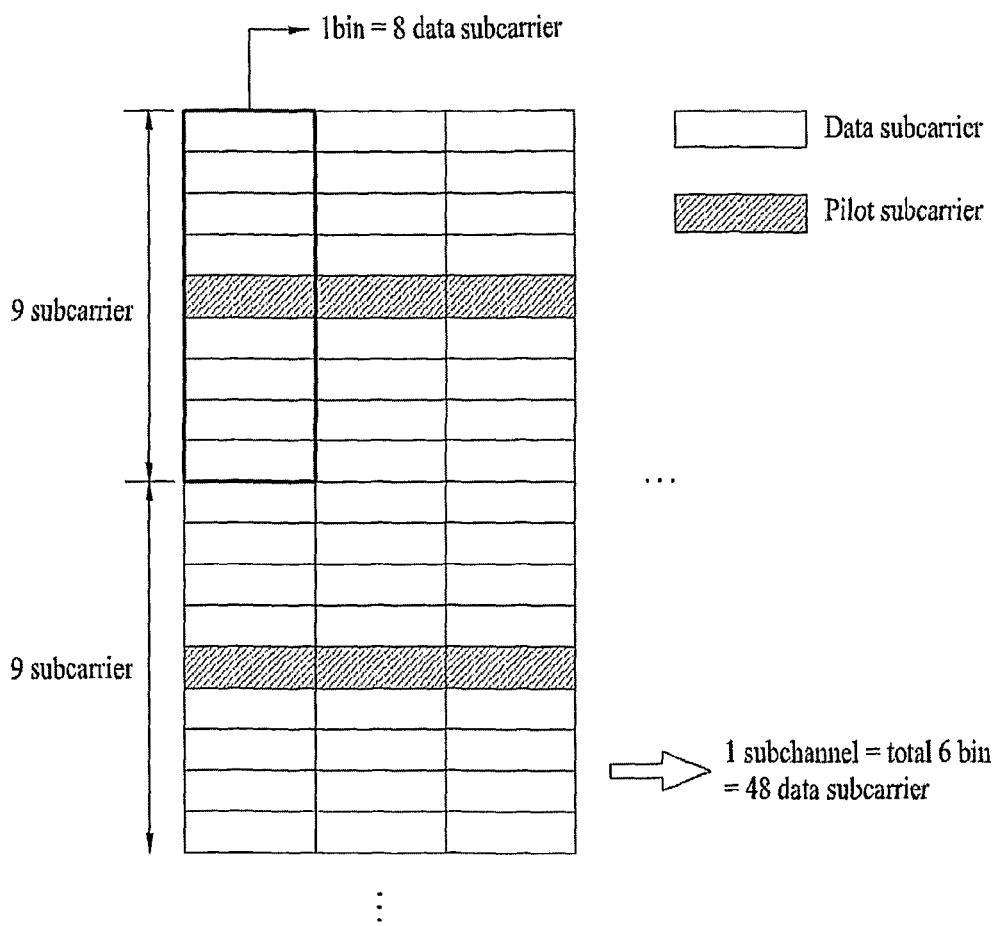
FIG. 1 is a diagram illustrating a structure of one subchannel when an AMC mode is used in the IEEE 802.16e system.

Meanwhile, the exemplary embodiment of the present invention proposes that the number of data transmitted through one subchannel be the same as the number of data in a conventional system. In the IEEE 802.16e system, 48 data subcarriers are transmitted through one subchannel throughout 6 bins each consisting of 8 data subcarriers per bin as illustrated in FIG. 1. However, when pilots are transmitted at intervals of 2 OFDM symbols, the number of data transmitted through one subchannel is larger than 48 and therefore a system should be modified.

Accordingly, the exemplary embodiment of the present invention provides a structure of a subchannel for increasing the amount of data transmission while maintaining compatibility with the conventional system using the fowling Equation 1.

$$D_S = I \times (S_b \times B + D_b \times B) \quad \text{[Equation 1]}$$

where $D_S$ indicates the number of data subcarriers transmitted through one subchannel, I indicates an interval of an OFDM symbol at which pilots are transmitted, $S_b$ indicates the total number of subcarriers per bin, $D_b$ indicates the number of data subcarriers included in a bin including pilots, and B indicates the number of bins in the same OFDM symbol area.

Under the assumption that $D_S$ is 48 and I is 2, possible combinations within the range of setting the other parameters in Equation 1 were reviewed. In more detail, it was assumed that $S_b$ may have proper values within the range of 1 to 20, B may have a variable value within the range of 1 to an FFT size, and $D_b$ may be set to a value subtracting 1 or 2 corresponding to the number of pilots from $S_b$.

As combinations satisfying the above conditions, a subchannel structure is proposed in which $S_b$ is 13, $D_b$ is 11, and B is 1 and a detailed description thereof is as follows.

Figure 2:
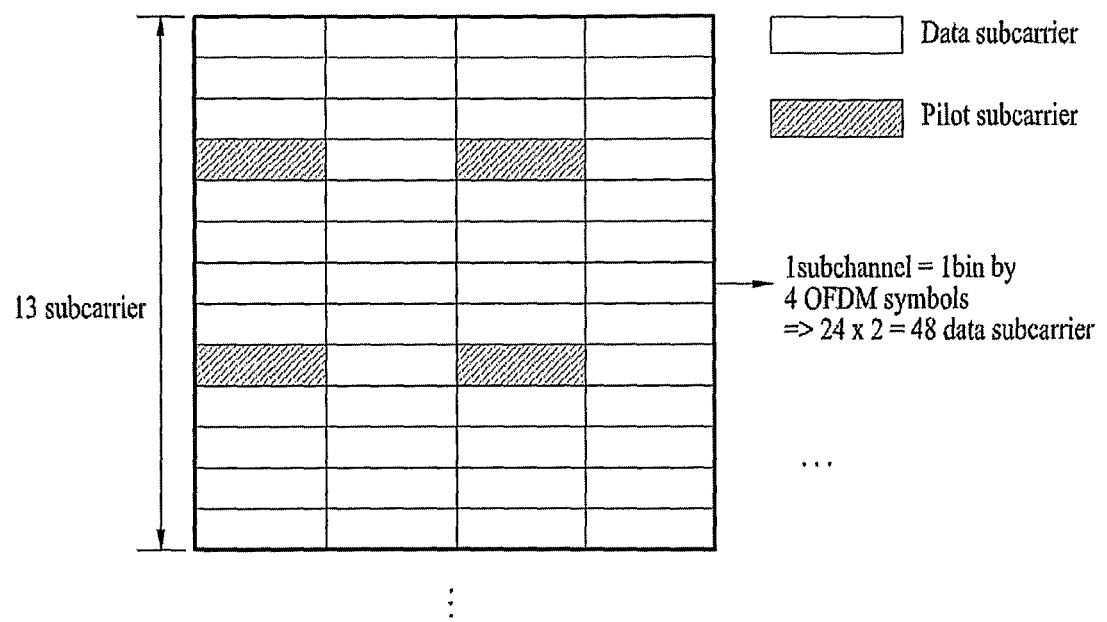
FIG. 2 is a diagram illustrating an improved structure of a subchannel according to an exemplary embodiment of the present invention.

FIG. 2 is a diagram illustrating an improved structure of a subchannel according to an exemplary embodiment of the present invention.

While, in the conventional IEEE 802.16e system, a bin includes 9 subcarriers and one subchannel includes 6 bins, the subchannel structure according to the exemplary embodiment of the present invention includes 4 bins each consisting of 13 subcarriers (i.e., $S_b$=13) throughout 4 OFDM symbols in the time domain.

In the exemplary embodiment of the present invention, odd-numbered bins and even-numbered bins have different structures. Each of the odd-numbered bins has 11 data subcarriers and 2 pilot subcarriers and each of the even-numbered bins has 13 data subcarriers. It will be apparent to those skilled in the art that each of the even-numbered bins may have 11 data subcarriers and 2 pilot subcarriers and each of the oven-numbered bins may have 13 data subcarriers. Assuming that indexes of 4 OFDM symbols are sequentially 0, 1, 2, and 3, bins in the OFDM symbols corresponding to the indexes 0 and 2 may include pilots and bins in the OFDM symbols corresponding to the indexes 1 and 3 may not include pilots, and vice versa. Locations of pilot subcarriers in bins including the pilot subcarriers may be changed only if at those locations the pilot subcarriers show the best performance for channel estimation.

Referring to FIG. 2, one subchannel is comprised of 4 bins. Like the conventional IEEE 802.16e system, 48 data subcarriers are transmitted through one subchannel having a structure of 1 bin×4 OFDM symbols.

The number of pilots transmitted through one subchannel in the subchannel structure shown in FIG. 2 is reduced to 4 from 6 which is the number of pilots in the IEEE 802.16e system. A reduction in the amount of pilot transmission through one subchannel leads to a decrease in the overall amount of pilot transmission as compared with system parameters according to the same FFT size, thereby increasing the amount of data transmission.

When using the subchannel structure according to the exemplary embodiment of the present invention, although the number of pilots transmitted through one subchannel is reduced, deterioration of channel estimation performance is minimized. In more detail, even though pilots, which haven been transmitted at intervals of one OFDM symbol to a low-speed UE, are transmitted at intervals of 2 OFDM symbols, since channel variations in time corresponding to one OFDM symbol are not great, deterioration of performance of channel estimation is insignificant. On the other hand, since intervals of transmitting pilots in the frequency domain are more reduced than intervals in the subchannel structure shown in FIG. 1, the performance of channel estimation in the frequency domain may be improved.

In the exemplary embodiment of the present invention, a method of adjusting the number of guard subcarriers is proposed in order to set the number of data subcarriers transmitted through one subchannel to 48, specifically, in order to set the number of subcarriers included in one bin to 13. In addition to the adjustment of the number of guard subcarriers, improved system parameters according to each FFT size are provided.

For convenience of description, an example when the FFT size is 128 will first be explained.

When the FFT size is 128, the number of used subcarriers, Nused, including a DC subcarrier is 109 in the above Table 4 illustrating the system parameters in the IEEE 802.16e system. The number of used subcarriers excluding the DC subcarrier is 108.

The number of used subcarriers except for the DC subcarrier corresponds to the number of subcarriers included in one bin and should be set to a multiple of 13. In this case, the number of used subcarriers excluding the DC subcarrier according to the exemplary embodiment of the present invention may be set to a value greater or less than 108 which is the number of subcarriers in the IEEE 802.16e system. If the number of used subcarriers excluding the DC subcarrier is set to a value greater than 108, the number of guard subcarriers according to the exemplary embodiment of the present invention is decreased compared with the number of guard subcarriers in the conventional IEEE 802.16e system. Conversely, if the number of used subcarriers excluding the DC subcarrier is set to a value less than 108, the number of guard subcarriers is increased compared with the number of guard subcarriers in the conventional IEEE 802.16e system.

In the exemplary embodiment of the present invention, the number of guard subcarriers is more increased than the number in the IEEE 802.16e system. Namely, a method is proposed of setting the number of used subcarriers excluding the DC subcarrier to a value less than 108, thereby efficiently solving an aliasing problem during signal transmission. In more detail, the number of used subcarriers excluding the DC subcarrier is set to 104 in the case of an FFT size of 128, that is, the number of bins is set to 8. Accordingly, the number of guard subcarriers in the corresponding FFT size is increased by as many as 4.

As can be understood from the subchannel structure shown in FIG. 2, the number of pilots per OFDM symbol is set to, on average, the number of bins, for example, to 8 in the corresponding FFT size. The number of data subcarriers per OFDM symbol is set to 96 (=(104×2−8×2)/2), when calculated by grouping 2 OFDM symbols and applying an average value per OFDM symbol.

Table 5 illustrates system parameters in case of an FFT size of 128 according to the exemplary embodiment of the present invention and system parameters in the IEEE 802.16e system.

TABLE 5

| Parameter | IEEE 802.16e | Present Embodiment |
|---|---|---|
| Number of DC subcarriers | 1 | 1 |
| Number of Guard subcarriers, left | 10 | 12 |
| Number of Guard subcarriers, right | 9 | 11 (Total 21% increase in number of left and right guard subcarriers) |
| Number of used subcarriers, including DC subcarrier | 109 | 105 |
| Total number of subcarriers | 128 | 128 |
| Number of pilots per 1 OFDM symbol | 12 | 8 |
| Number of total data subcarriers per 1 OFDM symbol | 96 | 96 |

Meanwhile, even when the FFT size is 2048, 1024, and 512, the guard interval and system parameters may be modified by the above-described method. Improved system parameters for the FFT size of 2048, 1024, and 512 according to the exemplary embodiment of the present invention compared with the parameters in the IEEE 802.16e system are shown in Tables 6, 7, and 8, respectively.

TABLE 6

| Parameter | IEEE 802.16e | Present Embodiment |
|---|---|---|
| Number of DC subcarriers | 1 | 1 |
| Number of Guard subcarriers, left | 160 | 166 |
| Number of Guard subcarriers, right | 159 | 165 (Total 3.8% increase in number of left and right guard subcarriers) |
| Number of used subcarriers, including DC subcarrier | 1729 | 1717 |
| Total number of subcarriers | 2048 | 2048 |
| Number of pilots per 1 OFDM symbol | 192 | 132 |
| Number of total data subcarriers per 1 OFDM symbol | 1536 | 1584 (3.13% increase) |

TABLE 7

| Parameter | IEEE 802.16e | Present Embodiment |
|---|---|---|
| Number of DC subcarriers | 1 | 1 |
| Number of Guard subcarriers, left | 80 | 83 |
| Number of Guard subcarriers, right | 79 | 82 (Total 3.8% increase in number of left and right guard subcarriers) |
| Number of used subcarriers, including DC subcarrier | 865 | 859 |
| Total number of subcarriers | 1024 | 1024 |
| Number of pilots per 1 OFDM symbol | 96 | 66 |
| Number of total data subcarriers per 1 OFDM symbol | 768 | 792 (3.13% increase) |

TABLE 8

| Parameter | IEEE 802.16e | Present Embodiment |
|---|---|---|
| Number of DC subcarriers | 1 | 1 |
| Number of Guard subcarriers, left | 40 | 41 |
| Number of Guard subcarriers, right | 39 | 41 (Total 3.8% increase in number of left and right guard subcarriers) |
| Number of used subcarriers, including DC subcarrier | 433 | 430 |
| Total number of subcarriers | 512 | 512 |
| Number of pilots per 1 OFDM symbol | 48 | 33 |
| Number of total data subcarriers per 1 OFDM symbol | 384 | 396 (3.13% increase) |

As can be appreciated from Table 5 to Table 8, a guard interval according to the exemplary embodiment of the present invention is wider than a guard interval of the IEEE 802.16e system, thereby efficiently solving an aliasing problem and further increasing the number of data subcarriers (with an FFT size of 128, the number of data subcarriers is the same).

Namely, the above-described AMC mode is used at a low speed, there is no significant difference in channel estimation even though the number of pilots is relatively small. Accordingly, a data transmission rate can be increased by increasing the number of data subcarriers.

Hereinafter, various embodiments for obtaining different or additional effects by modifying configurations based on the above-described embodiment will be described.

According to another exemplary embodiment of the present invention, a method of additionally increasing a data transmission rate by adjusting a guard interval in the system parameters of the above exemplary embodiment is proposed. The detailed adjustment of the guard interval and increase in the number of data subcarriers in case of FFT sizes of 2048, 1024, 512 and 128 are sequentially illustrated in the following Tables 9 to 12.

TABLE 9

| Parameter | IEEE 802.16e | Present Embodiment |
|---|---|---|
| Number of DC subcarriers | 1 | 1 |
| Number of Guard subcarriers, left | 160 | 159 |
| Number of Guard subcarriers, right | 159 | 159 |
| Number of used subcarriers, including DC subcarrier | 1729 | 1729 |
| Total number of subcarriers | 2048 | 2048 |
| (Number of pilots per 1 OFDM symbol | 192 | 133 |
| Number of total data subcarriers per 1 OFDM Symbol | 1536 | 1596 |

TABLE 10

| Parameter | IEEE 802.16e | Present Embodiment |
|---|---|---|
| Number of DC subcarriers | 1 | 1 |
| Number of Guard subcarriers, left | 80 | 76 |
| Number of Guard subcarriers, right | 79 | 76 |
| Number of used subcarriers, including DC Subcarrier | 865 | 872 |
| Total number of subcarriers | 1024 | 1024 |
| Number of pilots per 1 OFDM symbol | 96 | 66 |
| Number of total data subcarriers per 1 OFDM Symbol | 768 | 804 |

TABLE 11

| Parameter | IEEE 802.16e | Present Embodiment |
| --- | --- | --- |
| Number of DC subcarriers | 1 | 1 |
| Number of Guard subcarriers, left | 40 | 35 |
| Number of Guard subcarriers, right | 39 | 34 |
| Number of used subcarriers, including DC Subcarrier | 433 | 443 |
| Total number of subcarriers | 512 | 512 |
| Number of pilots per 1 OFDM symbol | 48 | 33 |
| Number of total data subcarriers per 1 OFDM Symbol | 384 | 408 |

TABLE 12

| Parameter | IEEE 802.16e | Present Embodiment |
| --- | --- | --- |
| Number of DC subcarriers | 1 | 1 |
| Number of Guard subcarriers, left | 10 | 5 |
| Number of Guard subcarriers, right | 9 | 5 |
| Number of used subcarriers, including DC Subcarrier | 109 | 118 |
| Total number of subcarriers | 128 | 128 |
| Number of pilots per 1 OFDM symbol | 12 | 8 |
| Number of total data subcarriers per 1 OFDM Symbol | 96 | 108 |

As appreciated from Table 9 to Table 12, the data transmission rate can be additionally increased in comparison with the examples shown in Table 5 to Table 8. Moreover, even in case of an FFT size of 128, the data transmission rate can be increased above the data transmission rate in the IEEE 802.16e system.

Meanwhile, there is proposed a method of constructing the same bin structure in respective OFDM symbol areas, rather than different bin structures in respective OFDM symbol areas as illustrated in the subchannel structure of FIG. 2.

In more detail, one subchannel includes 4 bins each having 13 subcarriers. However, a bin structure in each OFDM symbol area includes 12 data subcarriers and one pilot subcarrier and bin structures in respective OFDM symbol areas are the same.

Figure 3:
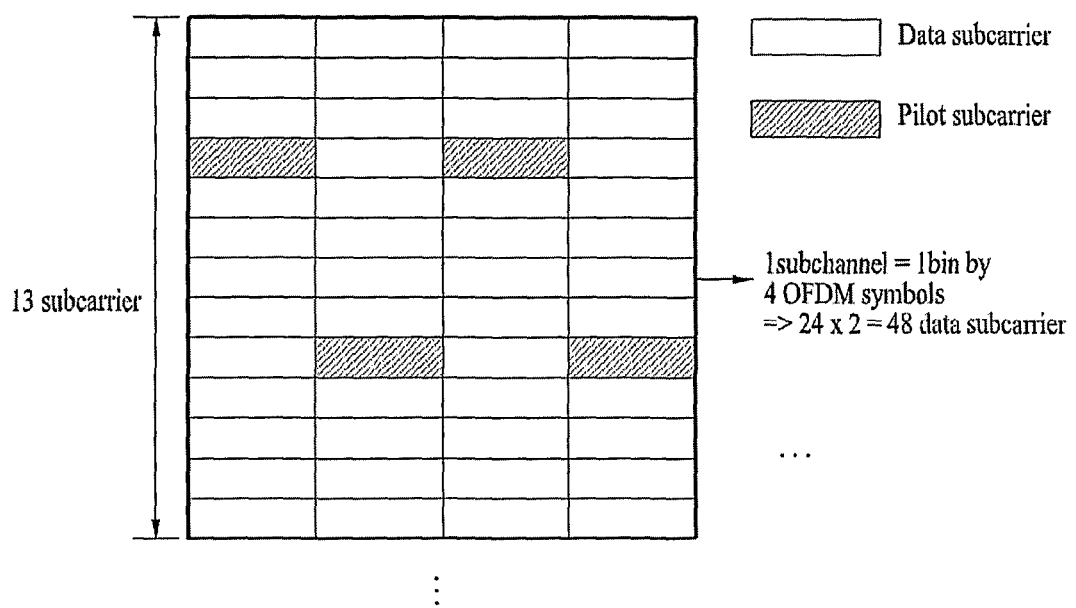
FIGS. 3 and 4 are diagrams illustrating structures of subchannels having the same bin structure in OFDM symbol areas according to another exemplary embodiment of the present invention.
Figure 4:
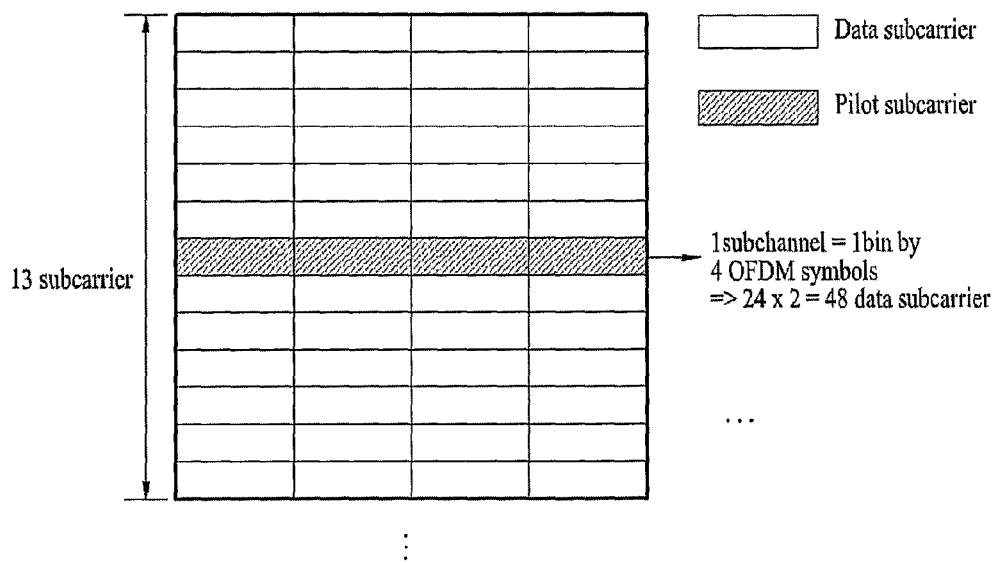

FIGS. 3 and 4 are diagrams illustrating structures of subchannels having the same bin structure in OFDM symbol areas according to another exemplary embodiment of the present invention.

The subchannels shown in FIGS. 3 and 4 include the same number of data subcarriers and the same number of pilot subcarriers as the numbers in the subchannel structure illustrated in FIG. 2. Using the subchannel structures shown in FIGS. 3 and 4, a specific transmitting side transmits one pilot per OFDM symbol. Namely, the transmitting side transmits one pilot per bin unlike FIG. 2.

Positions at which pilots are transmitted may be varied as shown in FIGS. 3 and 4. Other positions to transmit pilots which can improve performance of channel estimation above the performance of the positions shown in FIGS. 3 and 4 are possible. It can be readily appreciated that the subchannel structure includes 48 data subcarriers transmitted through one subchannel.

The exemplary embodiments of the present invention have been described for the subchannel structure of 1 bin×4 OFDM symbols. A further exemplary embodiment of the present invention includes subchannel structures of 2 bins×2 OFDM symbols and 4 bins×1 OFDM symbol. A description as to whether to modify a guard interval according to each FFT size in such subchannel structures will now be given.

Figure 5:
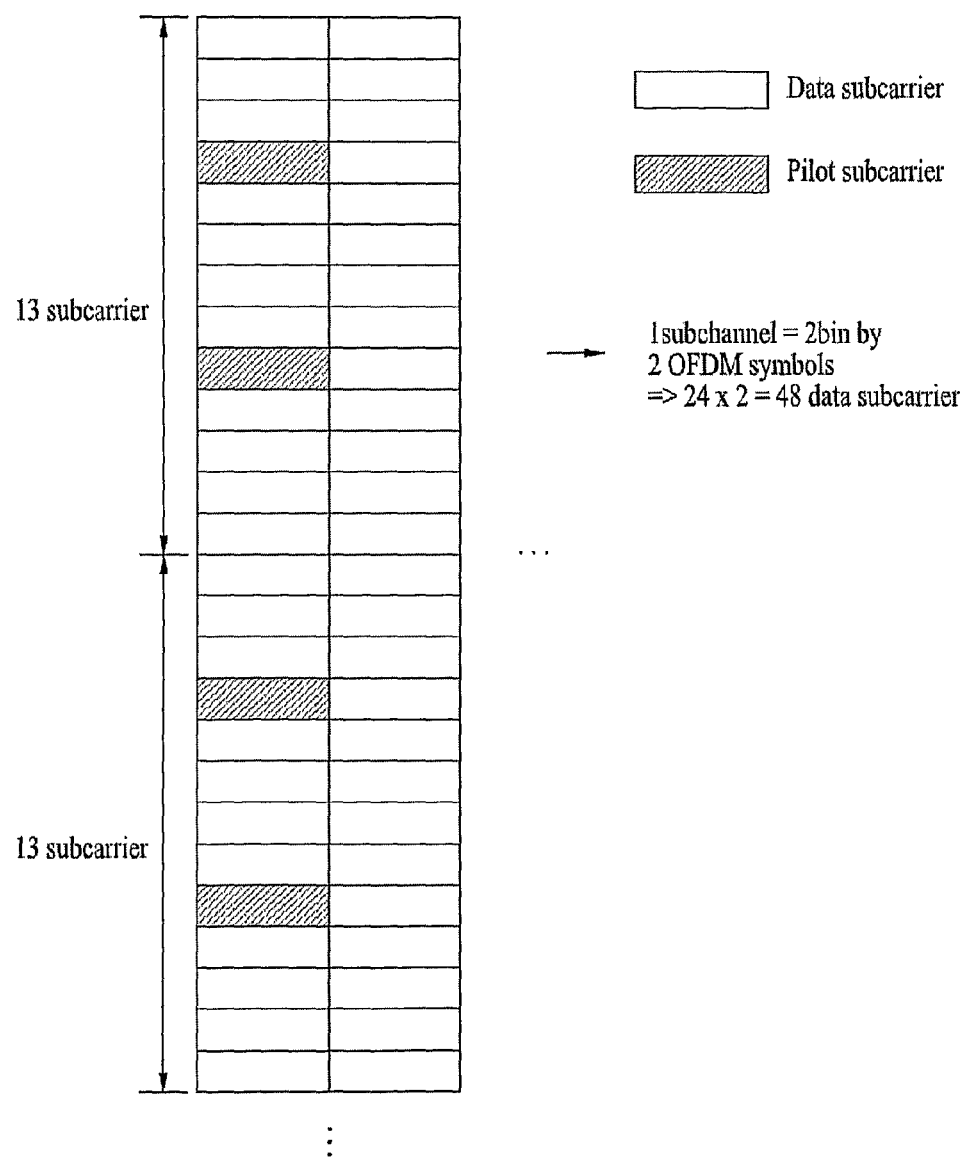
FIGS. 5 and 6 are diagrams illustrating structures of subchannels constructed in the form of 2 bins×2 OFDM symbols and 4 bins×1 OFDM symbol, respectively, according to a further exemplary embodiment of the present invention.
Figure 6:
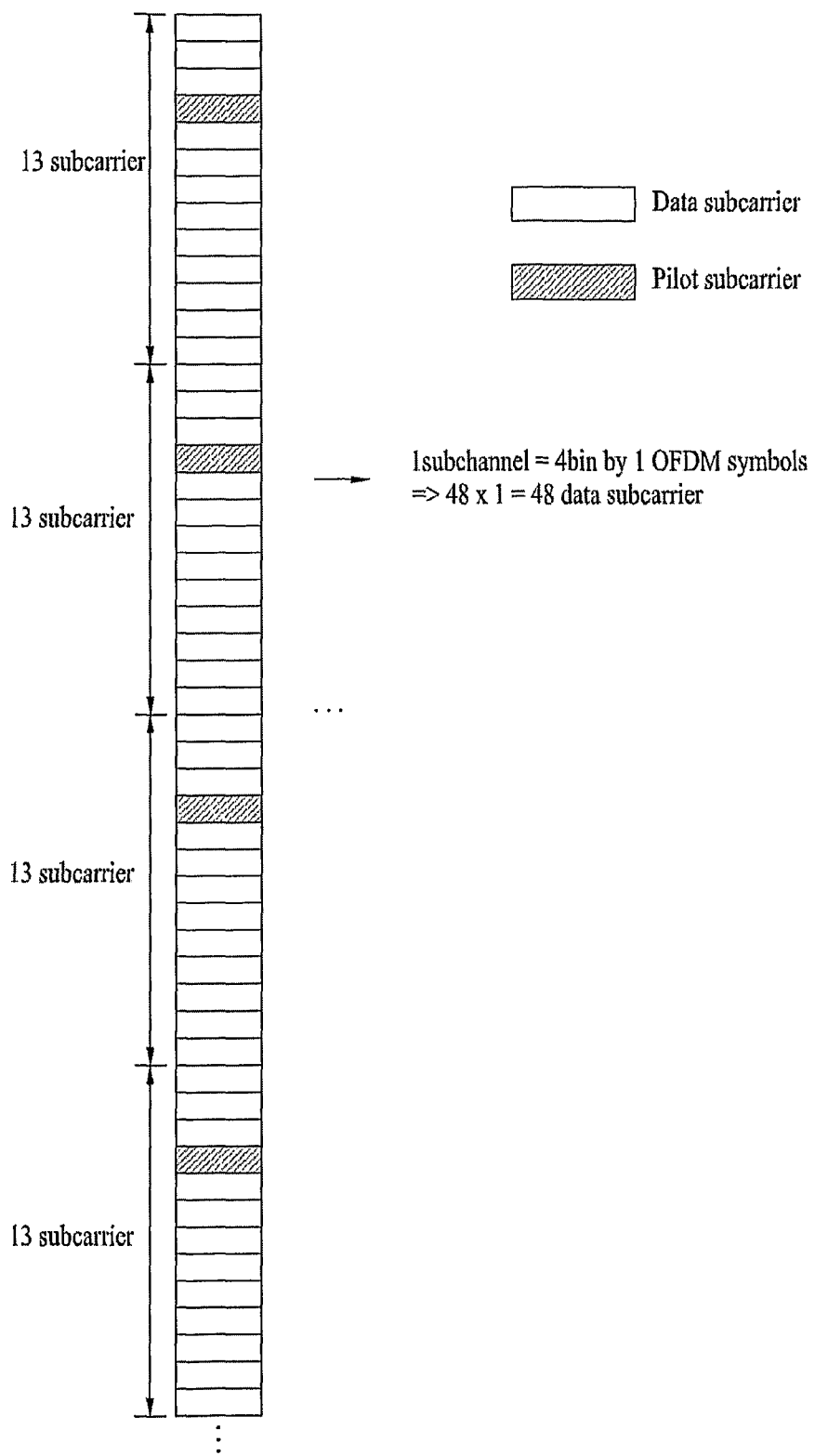

FIGS. 5 and 6 are diagrams illustrating structures of subchannels constructed in the form of 2 bins×2 OFDM symbols and 4 bins×1 OFDM symbol, respectively, according to a further exemplary embodiment of the present invention.

Referring to FIGS. 5 and 6, 48 data subcarriers are transmitted through one subchannel and one bin includes 13 subcarriers. In the structure constructing the subchannel of 2 bins×2 OFDM symbols as illustrated in FIG. 5, a bin corresponding to one OFDM symbol includes only 13 data subcarriers and a bin corresponding to the next OFDM symbol includes 11 data subcarriers and 2 pilot subcarriers, like the subchannel structure shown in FIG. 2. Unlike FIG. 5, one bin may include 12 data subcarriers and one pilot subcarrier in the subchannel structure having 2 bins×2 OFDM symbols, as illustrated in FIGS. 3 and 4. However, in a structure of 4 bins×1 OFDM symbol shown in FIG. 6, since 4 bins are positioned in one OFDM symbol area, it is difficult to set the different bin structures according to the OFDM symbols as shown in FIG. 2 and thus one bin includes 12 data subcarriers and one pilot subcarrier as illustrated in FIGS. 3 and 4.

Meanwhile, when the subchannel has a structure of 2 bins×2 OFDM symbols as shown in FIG. 5, the above-described system parameters can be used without modifying the guard interval in case of FFT sizes of 2048, 1024, and 128.

For example, in adjusting the number of guard subcarriers for an FFT size of 128 in Table 5, 8 bins in a structure of 2 bins×2 OFDM symbols are generated by 4 groups of 2 subchannels in the frequency domain.

However, in case of an FFT size of 512, system parameters are desirably changed as follows.

TABLE 13

| Parameter | IEEE 802.16e | Present Embodiment |
| --- | --- | --- |
| Number of DC subcarriers | 1 | 1 |
| Number of Guard subcarriers, left | 40 | 48 |
| Number of Guard subcarriers, right | 39 | 47 |
| Number of used subcarriers, including DC subcarrier | 433 | 417 |
| Total number of subcarriers | 512 | 512 |
| Number of pilots per 1 OFDM symbol | 48 | 33 |
| Number of total data subcarriers per 1 OFDM symbol | 384 | 384 |

In a structure of 4 bins×1 OFDM symbol, system parameters for FFT sizes of 2048 and 128 use the above system parameters without modification.

Figure 7:
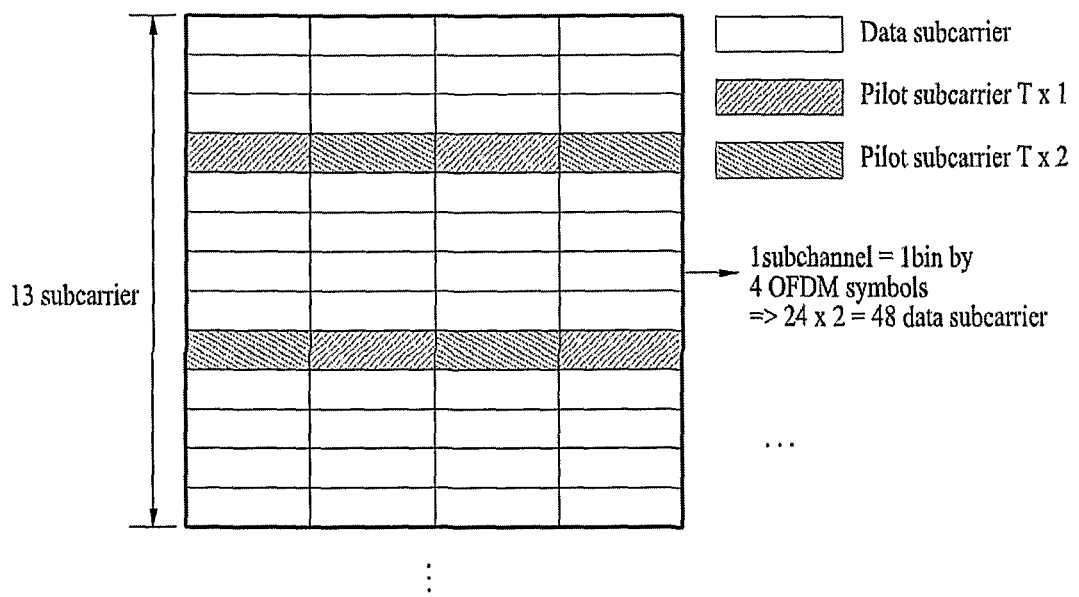
FIG. 7 is a diagram illustrating a structure of a subchannel of an exemplary embodiment of the present invention applied to a multiple antenna communication scheme.

FIG. 7 is a diagram illustrating a structure of a subchannel of an exemplary embodiment of the present invention applied to a multiple antenna communication scheme.

Referring to FIG. 7, a pattern of transmitting pilots through each antenna is shown when the number of transmit antennas is 2 in a multi-input and multi-output (MIMO) spatial division multiple access (SDMA) system. In more detail, in the structure of FIG. 7, pilots are transmitted through different antennas Tx1 and Tx2 in OFDM symbols in the subchannel structure shown in FIG. 3.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The system parameters including information as to a subchannel structure, a guard interval setting, etc. according to the present invention may be applied to the IEEE 802.16m system as an improved form of the IEEE 802.16e system.

A basic principle of a signal transmission method as a method of reducing the amount of pilot transmission in low-speed environments and increasing the amount of data transmission is applicable to 3GPP, 3GPP2, 3GPP LTE, and mobile communication systems for enabling a mobile transmitting side to transmit signals including data and pilots.

The invention claimed is:

1. A method for transmitting signals, the method comprising:
    transmitting signals including data and pilots through a subchannel in time-frequency space by a specific transmitting side,
    wherein a first signal transmission mode is used in a transmitting side having a mobile speed lower than a prescribed speed and a second signal transmission mode is used in a transmitting side having a mobile speed greater than the prescribed speed, and
    wherein, if the first signal transmission mode is applied to the specific transmitting side, the specific transmitting side transmits the signals by reducing the number of pilot transmissions per subchannel compared to when the second signal transmission mode is applied to the specific transmitting side,
    wherein the number of guard subcarriers is increased for reducing the number of pilot transmissions per subchannel by setting the number of subcarriers excluding a direct current subcarrier to integer multiple of subcarriers included in one bin,
    wherein the subchannel of the first signal transmission mode satisfies Ds=I×(Sb×B+Db×B), where Ds indicates the number of data subcarriers transmitted through one subchannel, I indicates an interval of an OFDM symbol, Sb indicates the total number of subcarriers per bin, Db indicates the number of data subcarriers included in a bin including pilots, and B indicates the number of bins in the same OFDM symbol area.

2. The method according to claim 1, wherein the specific transmitting side transmits pilots at intervals of 2 orthogonal frequency division multiplexing (OFDM) symbols in a time domain of the subchannel.

3. The method according to claim 2, wherein the subchannel includes a prescribed number of bins and wherein the number of subcarriers included in one bin is set such that the number of data transmitted through one subchannel is the same irrespective of the signal transmission modes applied to the specific transmitting side.

4. The method according to claim 3, wherein the number of subcarriers included in one bin is 13 and the subchannel includes 4 bins.

5. The method according to claim 1, wherein the subchannel includes 4 bins and the number of subcarriers included in one bin is 13, and
    wherein the specific transmitting side transmits a pilot at intervals of an OFDM symbol in a time domain of the subchannel, and the specific transmitting side transmits one pilot per bin.

6. The method according to claim 1, wherein the first signal transmission mode is an adaptive modulation and coding (AMC) mode.

7. The method according to claim 1, further comprising:
    performing inverse fast Fourier transform (IFFT) upon the signals before said transmitting signals, and
    wherein the number of guard subcarriers according to a unit signal size for performing the IFFT is set to be greater than the number of guard subcarriers when the second signal transmission mode is applied to the specific transmitting side.

8. The method according claim 1, wherein the number of subcarriers excluding direct current subcarrier is lower than the number of subcarriers of the second transmission mode.

* * * * *